United States Patent [19]
Mercy

[11] 3,715,729
[45] Feb. 6, 1973

[54] TIMING CONTROL FOR A MULTIPROCESSOR SYSTEM

[75] Inventor: Brian R. Mercy, Wappingers Falls, N.Y.

[73] Assignee: International Business Machines Corporation, Armonk, N.Y.

[22] Filed: March 10, 1971

[21] Appl. No.: 122,893

[52] U.S. Cl. ....... 340/172.5
[51] Int. Cl. ....... G06f 15/16
[58] Field of Search ....... 340/172.5

[56] References Cited

UNITED STATES PATENTS

| | | | |
|---|---|---|---|
| 3,551,892 | 12/1970 | Driscoll, Jr. | 340/172.5 |
| 3,602,900 | 8/1971 | Delaigue et al. | 340/172.5 |
| 3,312,951 | 4/1967 | Hertz | 340/172.5 |
| 3,562,716 | 2/1971 | Fontaine et al. | 340/172.5 |
| 3,579,201 | 5/1971 | Langley | 340/172.5 |

*Primary Examiner*—Paul J. Henon
*Assistant Examiner*—Melvin B. Chapnick
*Attorney*—Hanifin & Jancin and John S. Gasper

[57] ABSTRACT

A multiprocessor system has plural autonomous digital data processors operable to communicate individually with a common storage system. Each processor has its own clock. The timing control means selectively uses any one of the individual processor clocks for timing the communication of its or any other processor with the common storage system.

10 Claims, 5 Drawing Figures

INVENTOR
BRIAN R. MERCY
BY
ATTORNEY

TIMING CONTROL FOR A MULTIPROCESSOR SYSTEM

BACKGROUND OF THE INVENTION

The invention herein described was made in the course of, or under a contract, or subcontract thereunder, with the Department of the Navy.

1. Field of the Invention

This invention relates to digital data processing, and particularly to multiprocessor systems.

2. Description of the Prior Art

In a multiprocessor digital data system, a number of autonomous processors share a common system element, such as storage or memory. It is common practice to provide each processor with its own clock. The processor clocks are not usually synchronized. Thus, skewing of the processor clocks is a frequent occurrence. A problem occurs, therefore, in eliminating or compensating for the clock skewing when it is necessary for the processor to communicate with the common system element for exchange of data. Heretofore, considerable time was lost correcting for processor clock skew, since it was necessary to delay one or both of the operating elements of the system to synchronize their respective clocks.

SUMMARY OF THE INVENTION

It is the broad object of this invention to provide an improved multiprocessor system in which the problem of clock skewing is eliminated as a factor for communicating with a common system element.

It is a specific object of this invention to provide an improved multiprocessor system in which the clock skew problem is eliminated while permitting maximum autonomous operation of the processors.

It is a further object of this invention to provide a multiprocessor system having an improved timing control which eliminates the need for correcting for clock skew in the operation of plural processors which share a common storage means.

The above, as well as other objects, are achieved in accordance with this invention in a multiprocessor system by providing a timing control which selectively uses any one of the individual processor clocks for timing the communication of its, or any other processor, with the storage device. Specifically, the timing control of this invention provides means to determine whether a processor clock is already operating for the communication of data when a second processor calls for access to the common storage element. If not, the clock of the processor calling for communication of data with the common element is used for timing the transfer of data to and/or from the common element. If one of the processors is already in communication with a common element at the time a second processor calls for communication with the common element, the timing control has means for retaining the clock of the initial processor for timing the communication of data for the second processor to the common element. Thus, since in either case, only a single clock is used, the problem of clock skewing and the need for correction thereof is eliminated. Further, since clock skewing is no longer a problem in the communication of data between the processors and the storage device, the time previously allocated to correct for clock skewing can now be utilized directly in the transmission and reception of data under processor control.

The foregoing and other objects, features and advantages of the invention will be apparent from the following more particular description of a preferred embodiment of the invention, as illustrated in the accompanying drawings.

DESCRIPTION OF A PREFERRED EMBODIMENT

Figure 1:
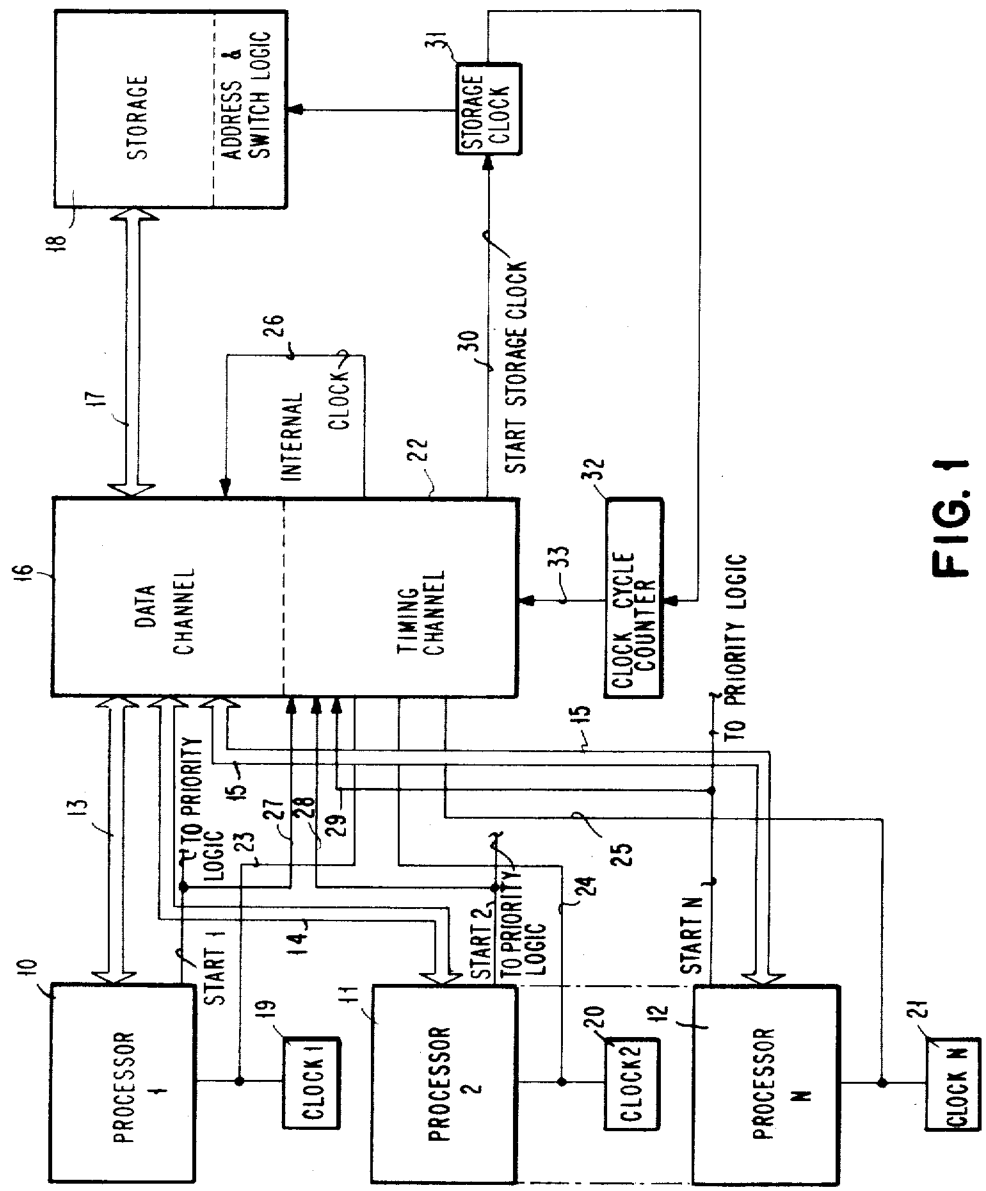
FIG. 1 is a simplified block diagram of a multiprocessor system with timing control means for using individual clocks of a plurality of processors for communicating data with a common storage device.

In a typical multiprocessor digital data processing system, as illustrated in FIG. 1, a plurality of autonomous data processors 10, 11, and 12 (also identified as Processor 1, Processor 2, and Processor N) are connected via individual processor data buses 13, 14, and 15, through a data communication channel 16 and a storage data bus 17 to a common or shared storage device 18. The processors 10–12 in the preferred embodiment are general purpose digital data processors. These can take various forms. A particular form of processor useful in the practice of this invention is described in the printed publication titled "-Digital Computer Design Fundamentals" by Yaohan Chu, published in 1962 by McGraw-Hill Book Company, Inc., at chapter 11, and particularly shown in FIG. 11-1 on page 399. The processors 10–12 generally are capable of performing a sequence of operations on digital data independently of each other. The processors would preferably have their own programming instructions and a control unit designed to control the various operations and the sequences therefor including the generation of signals for communicating data through the data channel 16 for communication with the storage means 18. Included in the operation controls of the processors 10–12 is some sort of timing means which generally includes a clock which might be an electronic circuit device, or the like, adapted to generate the essential sequence of timing pulses needed by the various parts of the individual processors to perform the aforementioned sequence of operations for processing digital data. In accordance with the practice of this invention in its preferred embodiment, each processor 10–12 has its own clock. Thus, clock 19 provides the basic timing pulses for processor 10 while clock 20 provides the timing pulses for processor 11 and clock 21 provides the basic timing pulses for processor 12. Specific details of the clocks 19, 20, and 21, except for timing pulse patterns, are not disclosed herein since such timing means are common to the digital data processing art and are readily understood by persons skilled in the data processing art.

Data communication channel 16 is essentially a logical network of any well-known type which operates to selectively connect the individual data buses 13, 14, and 15 to the data storage bus 17 for two-way transmission between the processors 10–12 and the storage device 18. Data communication channels are well known in the art and the manner and means for switching the various buses 13, 14, and 15 to storage bus 17 is well known. One such arrangement for connecting plural processors via data buses to a common storage useful in practicing the present invention is described in the IEEE Transactions on Computers, December 1969, Volume C18, pages 1132–1134. Also well known is the manner of receiving data from the buses and applying sequential timing pulses to the data channels for transmission to the individual buses.

The storage device 18 likewise may take various forms, such as a read/write core storage array and includes logic circuitry for addressing and driving the various core memory conductors for performing read and write operations for concomitant storing and reading out of data for communication on storage bus 17 to data channel 16. In the preferred form for practicing this invention, storage 18 has its own store clock 31 operable for timing the addressing and read/write operations of data for communication to the processors 10–12.

As previously stated, data transmitted between processors 10–12 and storage 18 to data channel 16 is controlled by timing pulses from the processor clocks 19–21. As illustrated in FIG. 1, the timing control comprises a timing channel 22. Timing pulses from processor clocks 19–21 are supplied by leads 23–25 to timing channel 22. Clock timing pulses, identified as INTERNAL CLOCK, for gating data through data channel 16 from buses 13–15 and 17 are provided on lead 26 from timing channel 22 to data channel 16. Start signals for initiating the control operations of the timing channel 22 are supplied from the processors 10–12 on control lines 27–29. The same Start signals are supplied to priority circuits of a type to be described further hereinafter. Control line 30 from timing channel 22 to storage clock 31 provides a Start Storage Clock signal for initiating the cycle of operations of storage clock 31 to perform the operation of read or write of data within storage 18. A clock cyle counter 32 determines when the storage clock cycle is complete and provides an appropriate control signal on line 33 to the timing channel 22.

Figure 2:
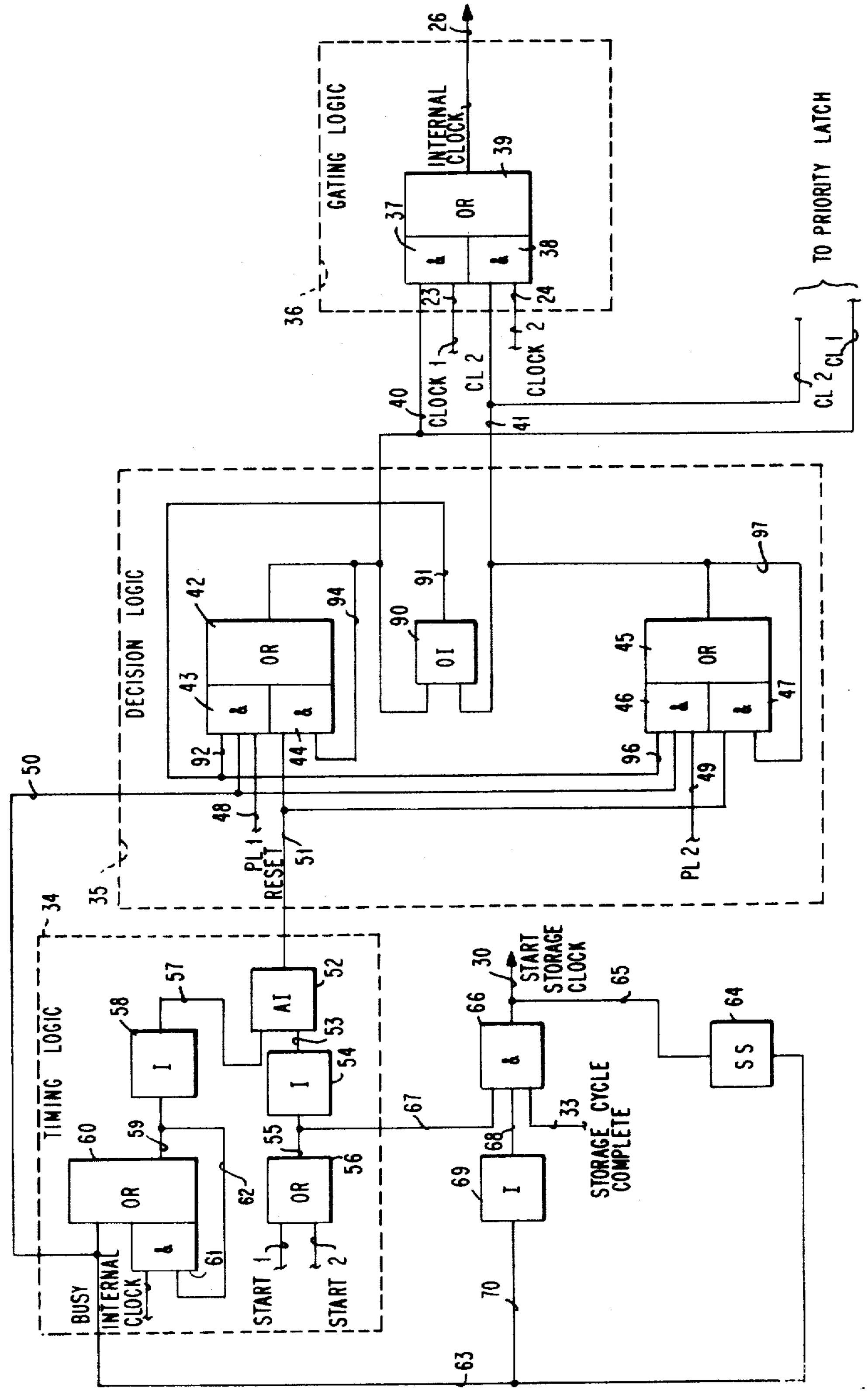
FIG. 2 is a logic diagram showing details of the timing control for a simplified embodiment of the multiprocessor system of FIG. 1.

The timing channel 22 is illustrated in greater detail in FIG. 2. For purposes of simplicity, and ease of understanding, timing channel 22 is shown for a multiprocessor system having only two processors 10 and 11. While only two processors are shown, it will readily occur to persons skilled, from the detailed description to follow, how a timing control could be designed for more than two processors.

Basically, timing channel 22 comprises timing logic 34, decision logic 35, and gating logic 36. Broadly defined, gating logic 36 allows timing pulses from clocks 19 and 20 on lines 23 and 24 to be applied to line 26 to the data channel 16. The decision as to which of the two clocks is to be used for timing the transmission of data is made by decision logic 35. Decision logic 35 decides on a clock as a result of control signal inputs from timing logic 34 and the priority circuit of FIG. 3 to be described hereinafter. The timing logic 34 indicates to the decision logic 35 when to change clocks.

Specifically, gating logic 36 comprises AND gates 37 and 38 connected to OR-gate 39 having an output connection to lead 26. Gating pulses CL1 and CL2 from decision logic 35 on lines 40 and 41 allow CLOCK 1 and CLOCK 2 timing pulses from processor clocks 19 and 20 to be gated through gating logic 36 to line 26 to data channel 16.

In the decision logic 35, the CL1 pulse is generated through OR circuit 42 from AND-gates 43 or 44. A CL2 pulse is generated through OR circuit 45 from AND gates 46 and 47. Priority pulses PL1 and PL2 on lines 48 and 49 to AND-gates 43 and 46, respectively, from the priority logic of FIG. 3 determines which of the two processors 10 and 11 has priority, if any, to communicate with storage 18. A BUSY signal on line 50 from timing logic 34 to AND-gates 43 and 46 indicates whether storage 18 is operating. A RESET signal on line 51 from timing logic 34 to AND-gates 44 and 47 tells the decision logic 35 when to allow a new clock to be gated to data channel 16.

In the timing logic 34, a means for generating RESET signal on line 51 comprises a logical AND Invert (AI) circuit 52 having a first input connected by lead 53 to Inverter 54, lead 55 to OR-circuit 56 which receives START 1 and START 2 signals from processors 10 and 11 on leads 27 and 28. A second input to AI circuit 52 is applied via lead 57 from inverter 58, lead 59 from OR circuit 60 and AND-circuit 61. Lead 62 provides a feedback from OR-circuit 60 to AND-gate 61. INTERNAL CLOCK pulses on lead 26 of gating logic 36 provide the other input to AND-gate 61. A BUSY signal is applied to OR-circuit 60 of the timing logic on line 63 which is connected to the output of Single Shot 64. Single Shot 64 is operated by a START STORAGE CLOCK pulse which appears on line 30 and is applied to the input line 65 of Single Shot 64. START STORAGE CLOCK signal is generated by AND gate 66 which has a first input from lead 67 and a second input 68 from inverter 69 connected by lead 70 to line 63 and a third input which is lead 33 from Storage Cycle Counter 32.

Figure 3:
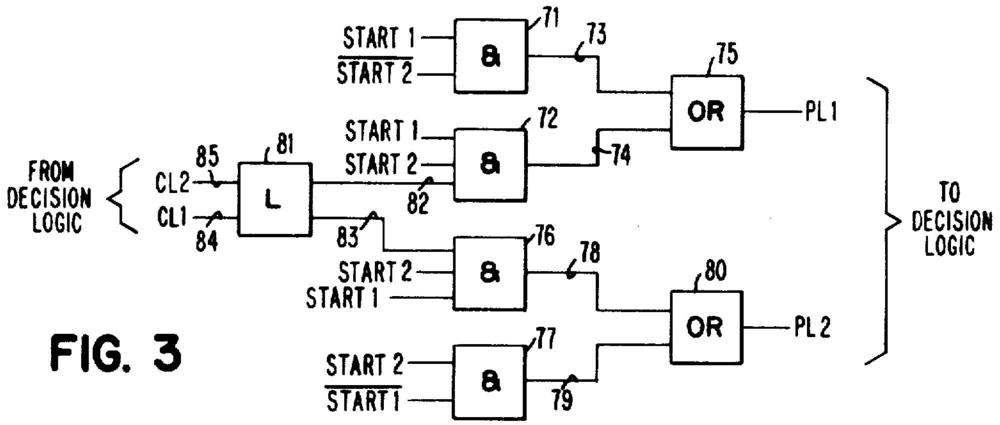
FIG. 3 is a logic diagram of the priority control for use with the timing control illustrated in FIG. 2.

A priority circuit for generating PL1 and PL2 pulses, as shown in FIG. 3, comprises a first pair of AND gates 71 and 72 having outputs 73 and 74 to OR gate 75, and a second pair of AND gates 76 and 77 with output connections 78 and 79 to a second OR gate 80. START 1 and $\overline{\text{START 2}}$ pulses from processors 10 and 11 are applied to AND-gate 71, while $\overline{\text{START 2}}$ and START 1 pulses are applied to AND-gate 77. START 1 and START 2 pulses from the processors 10 and 11 are applied both to AND-gates 72 and 76. A priority Latch 81 has outputs 82 and 83 connected to AND-gates 72 and 76, respectively. CL1 and CL2 signal pulses from decision logic 35 are applied on leads 84 and 85, respectively. Basically, the priority circuit's function is to select a clock only if the data communication operation has been completed and both processors 10 and 11 simultaneously generate Start commands. Thus, assuming clock 19 had been used, CL1 pulse on line 84 will have switched latch 81 providing an UP signal on line 83 and a DOWN signal on line 82. Thus, if START 1 and START 2 pulses are simultaneously generated by processors 10 and 11, a pulse will be generated by AND-gate 76 through lead 78 and OR-circuit 80 to produce a PL2 pulse to be applied on line 49 of decision logic 35. Conversely, if a CL2 pulse has previously been applied to line 85 of priority latch 81, line 83 will be DOWN and line 82 will be UP and simultaneous START 1 and START 2 pulses will gate a signal through AND-gate 72 via lead 74 to OR circuit 75 to apply a PL1 pulse on line 48 of decision logic 35.

As previously stated, the timing control of this invention functions to use the processor clocks to time data communication via channel 16 under the following two specific operating conditions: (1) if storage 18 is not operating, and a Start command is generated by either processor 10 or 11, the clock of the processor that generates the Start command is used; (2) if storage 18 is operating, and a Start command is generated by a processor, the clock of the processor presently in use to transmit data will continue to be used for the next operation.

To further clarify the important features of the subject invention, the following conditions will assume to be part of a preferred embodiment of a multiprocessor previously described:

1. The timing systems of processors 10 and 11 including clocks 19 and 20 are identical as well as independent.

2. The operation cycle times of processors 10 and 11 are also identical.

3. Storage 18 has an operation cycle equal to or some multiple of the operation cycle time of processors 10 and 11.

4. Storage 18 operates for only one cycle for each Start command from processors 10 and 11.

5. Processors 10 and 11 generate a Start command on their clock boundary.

Figure 4:
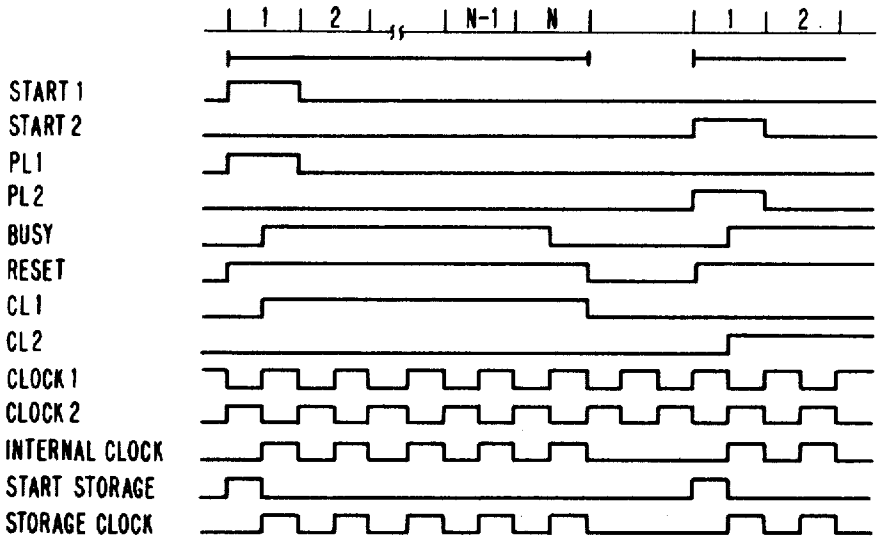
FIG. 4 is a first timing chart illustrating a first set of operating conditions for the multiprocessor shown in the preceding FIGURES.

With the above conditions in mind, and referring to the FIGS. 1–3 and the Timing Chart of FIG. 4, the detail operation of the multiprocessor system with timing control is as follows:

At time equals 0, CLOCK 1 and CLOCK 2 pulses are being generated at a constant uniform rate. Although FIG. 4 shows these timing pulses 180° out of phase, they are not necessarily in that condition, but can be timed at different phasings depending on their use in the processors 10 and 11. At the same time, RESET signal from timing logic 34 on line 51 to decision logic 35 is down. Assume a START 1 command is generated by processor 10 at time = 0. The START 1 pulse causes a PL1 pulse to be generated by the priority logic of FIG. 3 on the input line 48 to AND-gate 43 of decision logic 35. At the same time, the START 1 pulse on line 27 applied to the timing logic 34 causes RESET signal to come up on line 51 from AI circuit 52 through lead 53 and Inverter 54, lead 55 and OR circuit 56. AI circuit 52 is a logical circuit which is a well-known design such that if either input on line 53 or 57, or both is DOWN the output on line 51 is UP. Thus, when START 1 signal appears on line 27, a DOWN signal from Inverter 54 appears on line 53. At the same time, START 1 signals from OR cirucit 56 applies an UP pulse to AND-gate 66 on line 67. Since at this time, the storage 18 is not operating, storage cycle counter 32 provides an UP STORAGE CYCLE COMPLETE signal to a second input of AND-gate 66. Since the BUSY signal on line 63 is DOWN at time = 0, a third UP signal from inverter circuit 69 to AND-gate 66 produces a START STORAGE CLOCK signal on line 30. In addition to initiating the start of the timing of a storage sequence for storage 18 by storage clock 31, the START STORAGE CLOCK signal is applied through lead 65 to Single Shot 64 which generates a BUSY signal on line 63. The Single Shot 64 is timed to produce an UP busy signal for the entire operation cycle of storage 18. The BUSY signal applied to OR circuit 60 of timing logic 34 is inverted by Inverter 58 and applied to lead 57 to the second input of AI circuit 52 of the timing logic 34, thereby assuring that the RESET signal on line 51 stays UP during the entire BUSY period. Simultaneous with the application of a BUSY signal to the timing logic 34 the same signal is applied on line 50 to AND-gates 43 and 46 of decision logic 35. At the time T = 0, CL1 and CL2 pulses are DOWN; consequently, an UP signal from OI circuit 90 appears on line 91, 92, and 96 to AND-gates 43 and 46 of the decision logic 35. Thus, when an UP PL1 signal appears on line 48 and a BUSY signal appears on line 50, a CL1 pulse is generated from AND-gate 43, OR-gate 42, to line 40 into gating logic 36. CLOCK 1 timing pulses on line 23 to AND-circuit 37 of gating logic 36 are gated by the CL1 pulse on line 40 through OR-circuit 39 to line 26 to data channel 16. A finite period of time later, before the storage clock cycle is complete, the START 1 signal from processor 10 drops to 0. The PL1 pulse from the priority logic of FIG. 3 likewise drops to 0. Because of the feedback loop on line 94, the CL1 pulse is applied to AND-circuit 44 thereby holding CL1 UP during the period when a BUSY signal is applied to the timing logic 34.

At some time in advance of the end of the storage operation cycle, Single Shot 64 times out to drop the BUSY signal on line 63. This is done to compensate for time delays in conditioning the Start storage logic elements for start up on the next desired operation cycle. In the specific embodiment, Single Shot 64, as shown in FIG. 4, is designed to time out coincidentally with the arrival of last Internal Clock timing pulse. This last timing pulse applied to AND-gate 61 of Timing Logic 34 through OR-circuit 60, Inverter 58 to AI 52 holes Reset signal 51 up. At the completion of the last Internal Clock timing pulse, Reset signal 51 drops breaking the feedback loop on line 94 through AND-gate 44 and OR-gate 42, thus, CL1 drops to OI 90 allowing the reception of a new PL1 on line 48 at AND-gate 43 or a PL2 on line 49 at AND-gate 46. Also, the Internal Clock 26 will stop because CL1 drops. The storage cycle counter received the last Internal Clock pulse and will produce an UP signal to prepare AND-gate 66 to receive the next start signal on line 67 to initiate another storage clock operation.

Now assume sometime later a Start 2 command is generated by processor 11. This causes a PL2 pulse to be generated by the priority circuit logic of FIG. 3 from AND-gate 77 and OR circuit 80. Again, START 2 pulse applied to lead 28 causes timing logic 34 to generate a RESET pulse on line 51 since a DOWN signal is applied to AI circuit 52 on input line 53. Likewise, a second START STORAGE CLOCK signal is generated by AND-gate 66 on line 30, as previously described. Once again, Single Shot 64 is operated to generate a BUSY signal on line 63 which is applied to OR-circuit 60 of timing logic 34 and to line 50 to the decision logic 35. This time the PL2 pulse on line 49 and the BUSY pulse on line 50 gate a signal from AND-circuit 46, OR circuit 45 of the decision logic 35 to produce a CL2 pulse on line 41 to AND-gate 38 of gating logic 36. CLOCK 2 timing pulses which are being generated by processor 11 on line 24 are gated through AND-gate 38, OR circuit 39 to line 26 to data channel 16. When the START 2 pulse drops, the PL2 pulse from the priority logic circuit also terminates. However, due to the CL2 pulse on feedback 97 from OR circuit 45 to AND-gate 47, the CL2 pulse will be sustained so long as a RESET pulse appears from timing logic on line 51. As previously discussed, Single Shot 64 times out in advance of the end of the Storage Cycle and the INTERNAL CLOCK pulse applied to AND-gate 61 of Timing Logic 34 holds RESET up to the completion of the last timing pulse of the Storage Cycle. Upon completion of the storage cycle, storage cycle counter 32 will produce an UP signal to prepare AND-gate 66 to receive the next Start signal on line 67 to initiate another storage clock operation. When reset pulse on line 51 from the timing logic 34 to the decision logic 35 is dropped, it causes CL2 pulse on line 41 of the gating logic 36 to drop thereby blocking CLOCK 2 timing pulses to line 26 to data channel 16. Thus, the clocks of the individual processors 10 and 11 are used to time data through the data channel for their respective processor when communicating with the storage 18.

Figure 5:
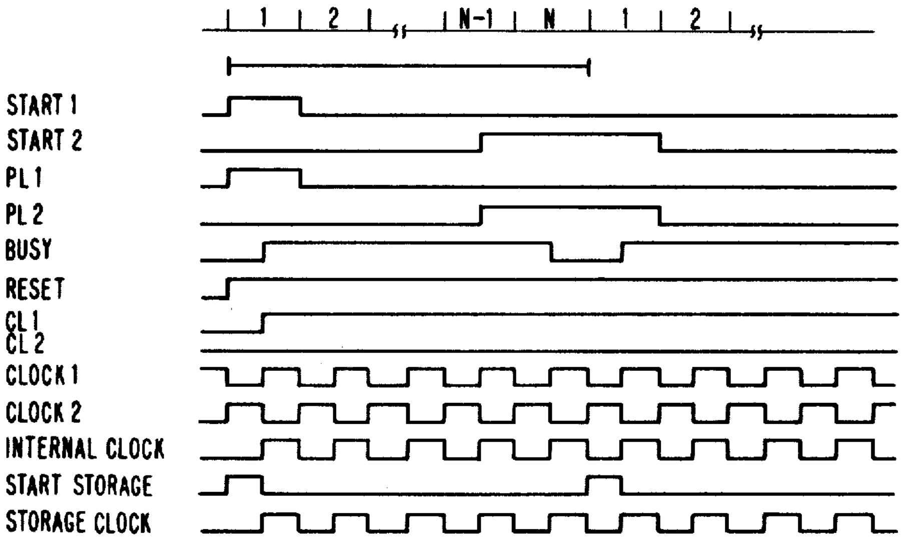
FIG. 5 is a second timing chart illustrating a second set of operating conditions for the timing control of the multiprocessor described in FIGS. 1–3.

Referring now to FIG. 5, the previous operating condition in which one processor clock was being used when the second processor issued a start command signal is described.

As seen in FIG. 5, the same operating conditions occur at time equals 0 as previously described in connection with FIG. 4. However, in this case, a START 2 pulse occurs during the time when the decision logic is generating a CL1 signal thereby gating CLOCK 1 pulses through gating logic 36 to line 26 to channel 16. In this situation, both a START 2 pulse and a BUSY pulse are being applied to the timing logic 34. As shown in FIG. 5, the BUSY pulse is still UP when the START 2 pulse arrives at OR-circuit 55 of the timing logic 34 since Single Shot 64 has not yet timed out. The application of both the BUSY pulse and the START 2 pulse in effect applies DOWN pulses to AI circuit 52 causing RESET pulse to remain UP on line 51 to the decision logic 35. As soon as the START 2 pulse is generated, the priority logic of FIG. 3 generates a PL2 pulse on line 49. Referring to FIG. 3, a START 2 pulse and a START 1 pulse applied to AND-gate 77 generates a PL2 pulse through lead 79 and OR circuit 80. The PL2 pulse is applied to AND-gate 46 of the decision logic 35. A BUSY signal on line 50 is also applied to AND-gate 46. However, no CL2 pulse is generated on line 41 to the gating logic 36 since the CL1 pulse on line 40 applied to OI circuit 90 applies a DOWN signal to lead 96 connected to AND-gate 46. With the above circuitry PL2 pulse will stay UP as long as the START 2 signal is UP. This UP period overlaps the end of the operation cycle of storage 18 when the BUSY signal drops. During this period, CLOCK 1 pulses have been gated through AND-gate 37 to line 26 to the data channel 16 which were used for timing the transmission of data through that channel. As described in connection with the previous operation shown in FIG. 4, when the BUSY signal drops and the last INTERNAL CLOCK pulse drops, the RESET pulse on line 51 goes DOWN. However, since a START 2 pulse is applied to Timing Logic 34 to AI circuit 52, RESET pulse remains UP. This, in turn, holds the CL1 pulse on line 40 UP since feedback 94 to AND-gate 44 continues to have a CL1 pulse applied to it. Thus, the CL1 pulse applied to OI circuit 90 inhibits the BUSY signal when it is later turned on by the START 2 pulse from gating the PL2 pulse to AND-circuit 46 of the decision logic. Thus, CLOCK 2 pulses are not gated on line 24 by CL2 pulse on line 41 to AND-circuit 38. Therefore, CLOCK 1 pulses continue to be applied to line 26 to the data channel 16 when processor 11 issues its start command to call for data to be communicated through channel 16. Subsequently, if processor 10 again calls for communication of data, a START 1 pulse overlapping the operation cycle of storage 18 which communicates data to processor 11 will similarly operate to hold clock 19 in service. Clock 19 will continue to be held in service over a succession of operation cycle intervals so long as the processors 10 and 11 issue Start commands which overlap the operation cycle of the storage device 18. Ultimately, an operational cycle for storage device 18 will be completed when no START 1 or START 2 pulse is present. In this situation, the system reverts to the operating conditions described in FIG. 4 and the next processor to generate a start command signal will initiate the operation of the timing control to use its own clock for communication of data. While the specific examples show the processors alternately issuing Start commands, it is within the purview of this invention for the same processor to issue a number of successive Start commands either while the storage device 18 is busy or not busy and before another processor issues its Start command. In any of these situations, the capturing of a processor clock in use can occur.

From the above, it will be seen that where overlap of a start command occurs, no time is lost for communicating data for the processor calling for communication time since the clock of the other processor is immediately pressed into use to time the communication of data from the processor issuing the command. Furthermore, no time is lost in either operating condition described by FIGS. 4 and 5 since only one processor clock is used to time the communication of data.

While the invention has been particularly shown and described with reference to a preferred embodiment thereof, it will be understood by those skilled in the art that various changes in form and details may be made therein without departing from the spirit and scope of the invention.

I claim:

1. In a multiprocessor system, the combination comprising:

plural digital data processors each having timing means operable to provide timing for their respective processors;

a system element shared by said processors;

means forming a channel for communicating data between said processors and said shared system element; and control means for timing the transmission of data over said channel between said shared system element and said processors including selection means operable for selecting a timing means of one of said processors for timing the communication of data between another of said processors and said system element.

2. A multiprocessor system in accordance with claim 1 in which said selection means is operable for selecting a timing means of one of said processors for timing the communication of data between either said one of said processors or another of said processors and said shared system element.

3. A multiprocessor system in accordance with claim 2 in which said selection means comprises means for determining whether a timing means of one of said processors is in operation for supplying timing pulses for communication of data, and means responsive to said determining means for deciding whether to hold said timing means of said one of said processors in service or to use the timing means of said another of said processors for successive communications of data.

4. A multiprocessor system in accordance with claim 3 in which said processors generate command signals for communicating data with said shared system element;

and said timing control means further includes means for generating a busy signal if one of said processors is in communication with said shared system element; and said decision means includes means responsive to said processor commands and said busy signal as a basis for holding a timing means of one of said processors or changing to a timing means of another of said processors.

5. A multiprocessor system in accordance with claim 4 in which said decision means is operable in response to coincident processor command signal and said busy signal to hold said timing means of said one of said processors in communication with said shared system element for timing a subsequent communication of said another of said processors with said shared system element.

6. A multiprocessor system in accordance with claim 4 in which said decision means is operable in response to a processor command signal in the absence of a busy signal to select the timing means of said processor generating said command signal to time the communication of data with said shared system element.

7. A multiprocessor system in accordance with claim 1 in which said processors are essentially autonomous digital data processing apparatus;

said timing means include clock devices operable to generate sequential timing pulses, independently to said processors, and said shared system element is a system storage means connected to said channel means for storing and retrieving digital data processable by said processors.

8. A multiprocessor system in accordance with claim 7 in which said system storage means includes a storage clock means for timing storage and retrieval of digital data transmissible via said channel means; and said timing control means includes means for initiating the operation of said storage clock means in synchronism with said clock devices.

9. A multiprocessor system in accordance with claim 8 in which said clock devices have identical operating timing cycles and said storage clock means has an operation cycle which is equal to or a multiple of said operating timing cycle of said clock devices.

10. A multiprocessor system in accordance with claim 7 in which said clock devices are continuously running and said control means comprises means for selectively gating signals of said clock devices to said channel means in response to control signals from said decision means.

* * * * *